March 10, 1959
F. D. BUTLER
2,876,947
MUTIPLE DRIVE GEAR AND PINION GEARED, MULTIPLE
PRESSURE STAGE COMPOUNDED, ELASTIC FLUID
COMPRESSOR, APPLICABLE TO
A COMBUSTION TURBINE
Filed Nov. 1, 1956
3 Sheets-Sheet 1
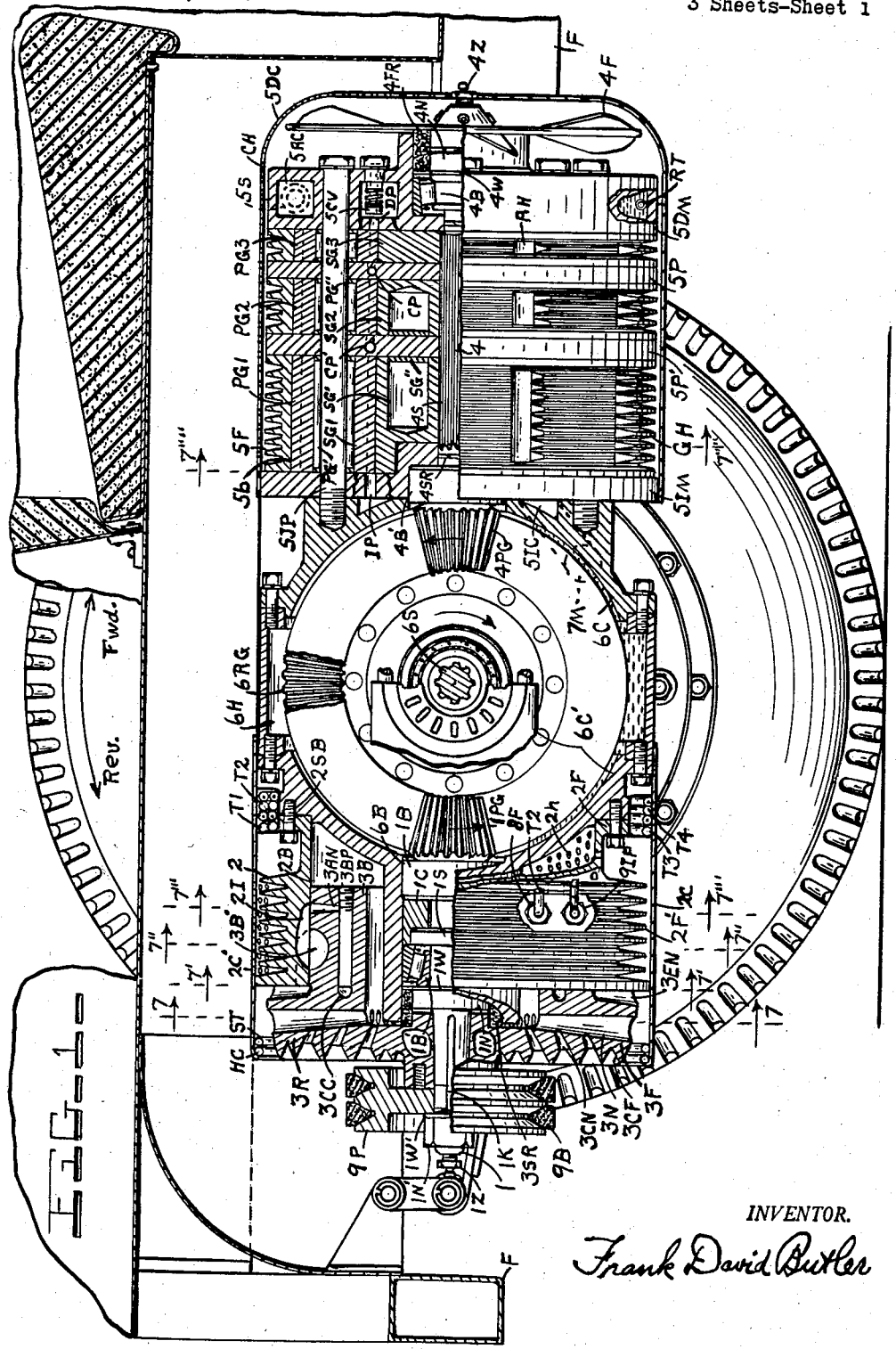
INVENTOR.
Frank David Butler March 10, 1959
F. D. BUTLER
2,876,947
MUTIPLE DRIVE GEAR AND PINION GEARED, MULTIPLE
PRESSURE STAGE COMPOUNDED, ELASTIC FLUID
COMPRESSOR, APPLICABLE TO
A COMBUSTION TURBINE
Filed Nov. 1, 1956
3 Sheets-Sheet 2
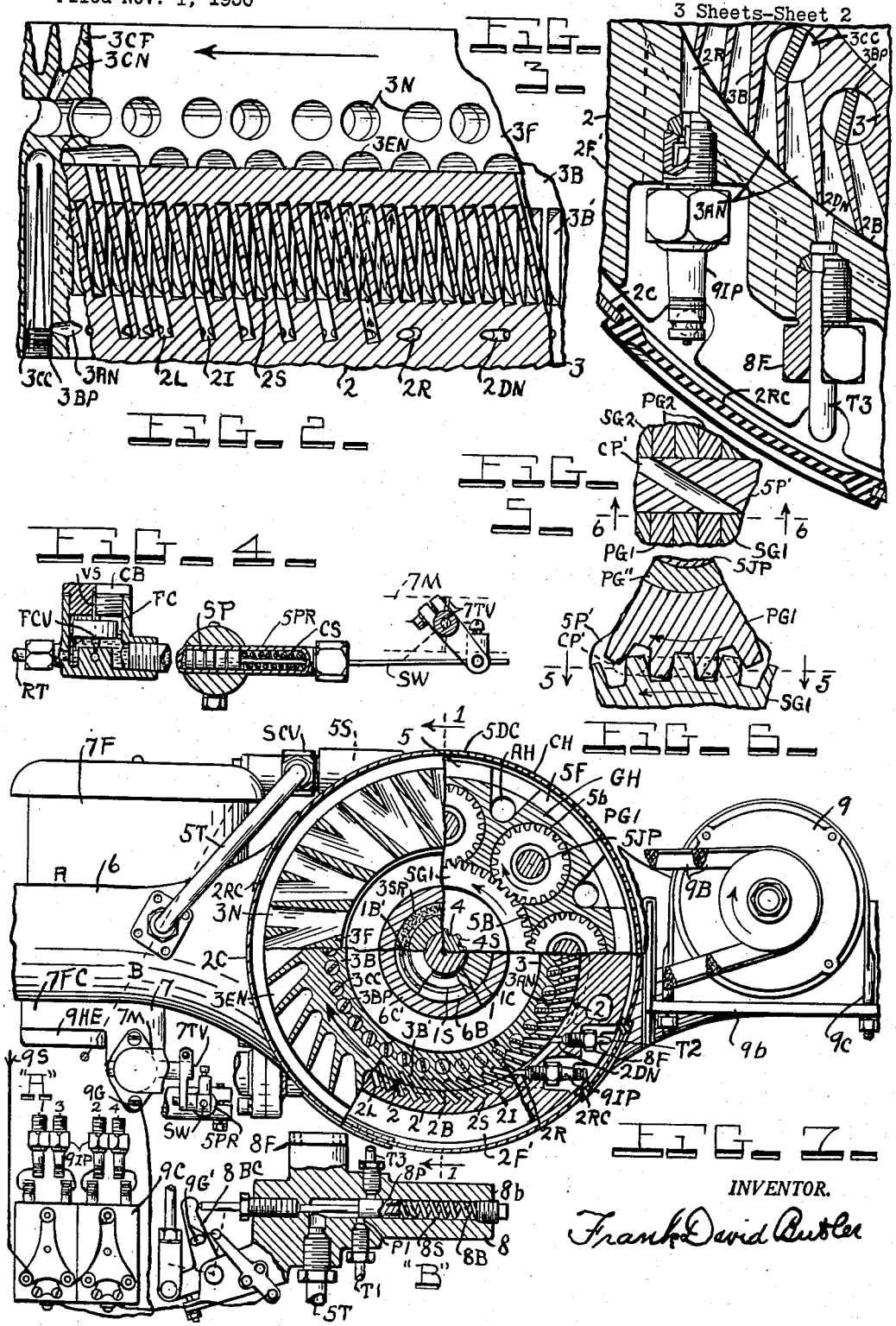
INVENTOR.
Frank David Butler

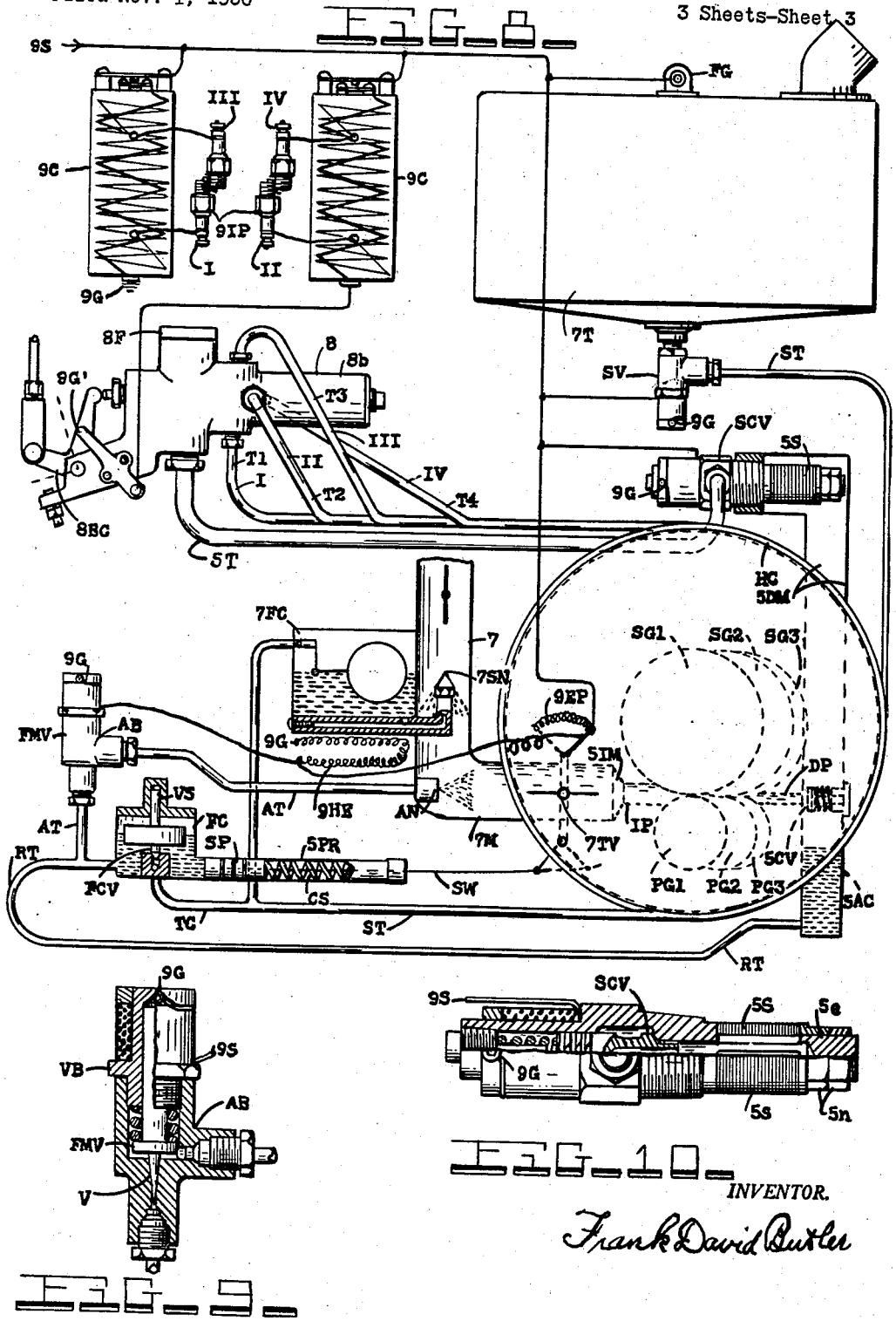

United States Patent Office 2,876,947
Patented Mar. 10, 1959

2,876,947

MULTIPLE DRIVE GEAR AND PINION GEARED, MULTIPLE PRESSURE STAGE COMPOUNDED, ELASTIC FLUID COMPRESSOR, APPLICABLE TO A COMBUSTION TURBINE

Frank David Butler, Venice, Calif.

Application November 1, 1956, Serial No. 619,881

11 Claims. (Cl. 230—141)

While my present invention relates in general to multiple drive-gear and pinion gear types of elastic fluid compressors, it particularly applies to multiple pressure stage compounding the gearing of such compressors in a self-contained compact unit assembly manner, and using such compressor for compressing elastic fuel mixture therein for an internal combustion turbine of and for an automotive vehicle.

The compressor assembly illustrated herein is used in conjunction with my T-shaped rotor type of multiple group expansion internal combustion turbine Patent No. 2,746,248 issued May 22, 1956, as may be used with my combined hydrodynamical and compounded planetary geared, pressure variable ratio reversible, transmission coupler Patent No. 2,799,182 issued July 16, 1957, which patents are obtainable from the U. S. Patent Office.

The major improvements contemplated in this compressor include the following: dividing the multiple drive-gears and multiple pinion-gears of the compressor up into, for example, three pressure compounding stages, with the 2nd stage gearing one-third as long as the 1st stage gearing, and, the 3rd stage gearing one-third as long as the 2nd stage gearing; separating the gearing of each pressure stage by a circular baffle plate partition; providing a cored cavity inlet manifold adjacent the 1st pressure stage gearing; providing a cored cavity discharge pressure accumulator manifold adjacent the highest pressure stage gearing; providing a combined strainer and electrical solenoid coil operative spring-loaded check valve threaded into a compressed fluid top outlet portion of said accumulator manifold for controlling such outlet; providing an automatically operative elastic fluid pressure regulator connected between a base of said accumulator and a suction side of said compressor; also providing a liquid fuel metering-valve connected to said base of the accumulator and to a pressure type fuel atomizer for injecting atomized surplus liquid supplied from said base back into the suction side of said compressor; a series of elongated cylindrical combined journal-pins and through extending securing and/or column bolts symmetrically spaced about the axis of compressor rotation, one being provided for each pinion-gear set and extending as a journal bearing therethroughout and threaded into said inlet manifold, and, securing the compressor tightly together as a unit assembly; and, means for locating the necessary porting of such compressor entirely within the latter so as to make it self-contained.

Other minor improvements will be disclosed from time to time as the specification description progresses.

With reference to the drawings: Fig. 1 is jointly a side elevation and longitudinal section of my multiple drive-gear and pinion geared type of multiple pressure staged compounded, self-contained automatically regulatable elastic fuel mixture compressor as applied to an internal combustion turbine assembly, applicable to the rear-axle-shaft-housing of an automotive vehicle, and as the section would appear on the dotted line 1—1 of Fig. 7; Fig. 2 is a diagrammatic fragmentary projection of the turbine stator and rotor along the dotted line 2—2 of Fig. 7, slightly outward radially from the stator bore and illustrates cooperation within one expansion group of the turbine; Fig. 3 is an enlarged section in detail through one of the compressed fuel mixture delivery nozzles and its paired ignition plug of one such expansion group; Fig. 4 illustrates the compressor regulator combined with a surplus fuel mixture trap which are both connected to a base of the compressor; Fig. 5 is an enlarged fragmentary section through one of the circular baffle portions separating the gearing of two adjacent pressure stages of the compressor as on the dotted line 5—5 of Fig. 6; the latter is a transverse section on the dotted line 6—6 of Fig. 5; Fig. 7 is jointly a fragmentary longitudinal elevation of the axle-shaft-housing and a plurality of transverse sections through the compressor and the turbine assembly of Fig. 1, and wherein, reading anti-clockwise, the upper left 90° is as on the dotted line 7—7 of the turbine, the lower left 60° as on the dotted line 7'—7', the lower 60° as on the dotted line 7''—7'', the lower right 60° as on the dotted line 7'''—7''', and, the upper right 90° as on the dotted line 7''''—7'''' of the compressor of Fig. 1, while the diagrammatic sketch "A" illustrates a pair of preferably 12 volt, vibrating contact point type of primary and endless secondary winding, induction ignition coils which each supplies ignition spark to two ignition plugs in series with one another, while the diagrammatic sketch "B" illustrates the manual control distributor for distributing compressed fuel mixture and ignition electricity to the turbine; the diagrammatic sketch Fig. 8 illustrates the combined distribution circuit means fuel fluid, compressed elastic fuel mixture, and electricity of the compressor and turbine assembly; Fig. 9 is a sectional view through a prospective spring-loaded electrical solenoid coil operative fuel metering valve for the compressor surplus fluid injection back into the suction side of such compressor through the fuel atomizer; and, Fig. 10 is a sectional view through a prospective spring-loaded electrical solenoid coil operative combined outlet check-valve and fuel mixture strainer for the compressor accumulator.

With reference to the drawings, similar symbols represent and indicate similar parts in the several views and wherein: The numeral 1 indicates the turbine shaft which is rotatively journalled upon the pair of adjustable roller bearings 1B and 1B' concentrically with the elongated bore 2B of the flanged annular shaped turbine stator 2, which latter is flanged bolted to preferably the rear cover 6C' of the usual, banjo-type-of, rear axle shaft housing 6H of an automotive vehicle, and which places the bore 2B, concentric with the bore 6B of said cover 6C' extending at right angles to the housing 6H. The turbine rotor 3 is of the T-shaped type, as previously mentioned, and is secured to rotate coaxially in one direction with said shaft 1 and is provided with an annular shaped body 3B which is rotatable concentrically closely within said bore 2B and is integral with a projecting flanged T portion 3F which forms the hub of such rotor and extends over the rear end of the turbine stator 2. The numeral 4 indicates the elongated splined compressor shaft which is rotatively journalled upon the pair of adjustable roller bearings 4B and 4B' concentrically within the compressor body bore 5B, which houses the multiple pressure staged compounded drive-gears of the cylindrically shaped fabricated compressor 5. The latter is provided to be of a multiple spur-drive-gear SG1, SG2 and SG3, and pinion-geared PG1, PG2 and PG3 multiple pressure staged compounded elastic fuel mixture compressor for said turbine, and to be bolted to the cover 6C, forming the cored portion of the compressor inlet manifold, located on the opposite side of housing 6H from and axially in line concentrically with said shaft 1 and rotor 3. The turbine shaft 1 is integral with the bevel pinion-gear 1PG which drives the bevel ring-gear 6RG, wherein the axle-shaft 6S are splined, which ring-gear 6RG rotatively drives the bevel pinion-gear 4PG of the compressor shaft 4 in the opposite direction to said shaft 1.

As the complete compressor and turbine motive power assembly is designed and arranged so that gasoline mixed with diesel fuel or refined crude oil may be used therein, no lubricant need be used in addition thereto for lubricating the compressor gearing. However as crude oil will not atomize in its natural state, means must be applied to the carburetor bowl so as to reduce the viscosity of such oil by heating, also a means must be applied for both metering and atomizing the excess solid fuel which would normally collect in the base of the accumulator, and to atomize and inject this surplus fuel back into the suction side of the compressor 5 where in the latter the elastic fuel mixture is multiple pressure stage, compounded, compressed and is then discharged, under a relatively high constant pressure, into the accumulator manifold and/or compartment 5AC which becomes the source of supply of such mixture for the turbine.

In construction, the fuel mixture compressor 5 is a fabricated assembly consisting of: the compressor shaft 4 provided with the gear 4PG, the bearings 4B and 4B' with their tongued washer 4W and nut 4N, the elongated spline 4S over which the compressor drive-gears are slidable, the piston ring type of non-rotating oil seal rings 4SR one located adjacent either end of 4S, the Zerk lubricating fitting 4Z at the end of 4 opposite to 4PG, the hub of fan 4F secured to 4 adjacent to fitting 4Z, and, the felt oil seal ring 4FR surrounding said hub and also said nut 4N; the cylindrical shaped induction and/or inlet manifold 5IM which supports the bearing 4B' and with the cored front cover 6C is connected to a fuel supply carburetor 7 via the manifold 7M, the suction throttle-valve 7TV and the cored induction chamber 5TC; the cylindrically shaped core compressor discharge and/or accumulator manifold 5DM which supports the bearing 4B and is provided with a cored accumulator compartment 5AC therein with a return tubing connection RT adjacent its base and an outlet solenoid controllable check-valve SCV adjacent its top end threaded thereinto; three different lengths, in this example case, of cylindrical shaped compressor body gearing housings GH, each provided with a relatively large diameter bore 5B, extending concentrically to shafts 1 and 4 to receive their respective 1st, 2nd and 3rd pressure stage drive-gears SG1, SG2 and SG3, a series of symmetrically spaced similar length parallel extending relatively small diameter cylindrical chamber bores 5b to receive each their respective set of three pressure stage pinion-gears PG1, PG2 and PG3, a series of annular shaped cooling fins 5F extending around the circumference thereof, and, one air access hole AH extending parallel with and located intermediate to each adjacent chamber bore 5b; a pair of circular shaped baffle partition plates 5P' and 5P respectively separating the 1st and 2nd, and the 2nd and 3rd pressure stages; a series of elongated cylindrical combined journal-bearings and bolting pins 5JP one extending throughout and concentrically with each cylindrical chamber bore 5b and provided for the journal of the pinion-gear bearings thereof each such bore, and, each to be headed against said manifold 5DM and threaded into the cover 6C for securing the complete compressor assembly tightly together as a unit; at least one fuel mixture induction and/or inlet port IP, for each set of said pinion-gears, each extending axially through the manifold 5IM from the induction chamber 5IC to the out-meshing side of each adjacent first stage pinion-gear PG1 with the drive-gear SG1; at least one communication port CP', for each set of pinion gears, each extending diagonally axially through the first stage partition 5P' from the inmeshing side of each adjacent pinion gear PC1 with drive-gear SG1 to the outmeshing side of each adjacent pinion gear PG2 with drive-gear SG2; at least one similar communication port CP, for each set of pinion gears, each extending diagonally axially through the second stage partition 5P from the inmeshing side of each adjacent second stage pinion gear PG2 with drive-gear SG2 to the outmeshing side of each adjacent third stage pinion-gear PG3 with drive-gear SG3; at least one discharge port DP, for each set of pinion gears, each extending axially through the third stage side of the discharge manifold 5DM from the inmeshing side of the adjacent pinion gear PG3 with drive-gear SG3 into the cored accumulator manifold compartment 5AC; at least one spring-loaded check-valve covering the 5AC end of each discharge port DP and preferably provided each with a neoprene disc bonded thereto; a U shaped dust cover 5DC enclosing such compressor 5 and provided with a multitude of radially extending air circulating holes CH in the top half only thereof; the fan 4F for inducing air into 5DC and circulating it through said holes CH; the fuel metering valve FMV and atomizer nozzle AN means for returning excess fuel fluid from said base of 5AC and discharging it back into the suction side of compressor 5; the combined multiple disc strainer and check-valve SCV means for controlling the discharge and/or release of compressed fuel mixture from 5AC; and, the pressure regulator means 5PR for maintaining a predetermined constant pressure upon the discharge side of compressor 5.

The pressure regulator 5PR is provided with a slidable piston SP opposed opposite its fuel supply end by a coil spring CS and provided at this end with an elongated spring wire SW secured therein, and wherein the opposite end of SW is connected to a bell-crank which operates the carburetor 7 throttle-valve 7TV for controlling the discharge pressure of 5 within 5AC by opening and/or closing 7TV.

With reference to the combined compressor and turbine control circuits Fig. 8: 9S indicates electrical supply and 9G its ground; FG is a fuel gauge of fuel supply tank 7T while SV is the solenoid controlled stop valve of 7T and ST is the supply tubing to carburetor float-chamber 7FC; 9EP is an electrical potentiometer operative by 7TV and controlling electrical supply to solenoid of FMV and heating element 9HE which latter is under 7FC and reduces viscosity of oil fuel in latter; 9C are the two ignition induction coils previously mentioned and which each supply two ignition plugs 9IP, wherein one of 9C is grounded through wire 8F at insulated arm at 9G' during movement of bell-crank 8BC of the combined electrical ignition and compressed fuel mixture manually operable distributor 8 (see Fig. 7 "A" and "B" for detail), and wherein compressed fuel is supplied to 8 from SCV via supply tubing 5T and is distributed to turbine diffuser nozzles 2DN through the respective distributing tubing T1, T2, T3 and T4 by the tubing fittings 8F (as in Fig. 3); wherein excess fluid fuel is supplied from return tubing RT to atomizer nozzle AN via FMV and atomizer supply tubing AT and is injected via AN into suction manifold 7M along with vaporized fuel mixture entering latter past spray nozzle 7SN; and, wherein a float-type check-valve FCV may be used to trap dump excessive surplus liquid fuel into 7FC via tubing connection TC.

Wherein in details: the distributor 8 (Fig. 7"B") may have a body portion 8b, a bore 8B, a piston 8P, a coil spring 8S, and, a bolting flange 8F; the fuel metering-valve FMV (Fig. 9) may have an assembly body AB, a valve proper V, a valve bonnet VB, a spring-load for V, and, a solenoid coil for operating V; the non-return check valve SCV (Fig. 10) may have a strainer assembly 5S with numerous strainer discs 5s, a spring-load, a solenoid coil to operate the valve proper, adjustment nuts 5n, at end 5e, for adjusting 5S, and, may be threaded into adjacent the top of accumulator compartment 5AC as in Figs. 1 and 8; and, the compressor regulator 5PR, Figs. 4 and 8 may be arranged as illustrated in latter figure and may be combined with the float-type check-valve FCV, and wherein the latter may be provided with tubing connections with RT and TC, a valve-stem VS, a float-chamber FC, and, a threaded cover bonnet CB.

Inasmuch as the transmission couplers as mentioned in the preamble of this specification are of combined hydrodynamic and compounded planetary geared, pressure variable ratio reversible, type with one each mounted in each rear wheel assembly, and as the turbine is also as mentioned in such preamble and is arranged in non-sprung manner and is as in said patent, it will only be described in brief herein, and consists of: the turbine shaft 1 is provided with said adjustable bearings 1B and 1B' having tongued washer 1W and nut 1N, a spacer collar 1C with seal assembly 1C pressed therein, the bevel gear 1PG at one end thereof, the double V pulley 9P secured along with rotor 3 over the tapering fit with 1 and keyed thereto by key 1K and secured with tongued washer 1W' and nut 1N', and, a Zerk lubricating fitting 1Z in adjacent end of 1; the 12 volt D. C. motor generator 9 supported by bracket 9b and secured thereto by clamps 9c and for rotatively starting 1 through V belts 9B and said pulley 9P; the turbine stator 2, provided with the bore 2B and secured by flange 2F to said rear casing 6C', also provided with a series of pressure velocity expansion groups disposed symmetrically in bore 2B and each provided with one diffuser nozzle 2DN, one ignition plug 9IP terminating in a recess 2R in bore 2B, a series of three different lengths of stator expansion chamber buckets 2S short, 2I intermediate and 2L long each machined obliquely axially in and extending tangentially to bore 2B in opposite to the direction of rotor rotation therein, wherein said stator is further provided with a series of radially extending cooling fins 2F', and, a series of radially extending air circulating holes 2h located in bottom half only of 2B; and, a cylindrical dust-cover 2C, provided with a series of radially extending air circulating holes 2C' in the top half only thereof, and, four neoprene removeable elastic inspection covers 2RC, one for each pair of fittings 8F and plugs 9IP.

The turbine rotor 3 consists briefly of: the body portion 3B rotatable closely within the bore 2B and provided with a row of axially extending cylindrical combustion chambers 3CC each having a rounded closed end and an opposite threaded end; a row of pairs of converging access nozzles 3AN, each pair extending from the periphery of the rotor into a rim portion of 3B, tangentially in the direction of rotor rotation, into its respective chamber 3CC; a row of elongated baffle partitions 3BP with one threaded into each 3CC and separating the converging ends of 3AN terminating therein; and, a row of semi-circular shaped rotor expansion chamber buckets 3B' each extending tangentially into said rim portion in the direction of rotor rotation and located outward radially from 3CC; the overhanging flanged portion 3F, integral with the body portion 3B of 3, extends beyond the adjacent end of stator 2 and forms the hub of rotor 3 and is provided with; a row of semicircular exhaust nozzles 3EN cooperative with the adjacent open ends of said long buckets 2L in stator 2; an adjacent row of tangentially extending diverging island type of circulating air induction nozzles 3N; a series of axially extending annular shaped cooling fins 3CF; a series of rows of obliquely axially extending diverging cooling nozzles 3CN, each originating in one of the nozzles 3N and terminating between two adjacent fins 3CF; the felt sealing ring 3SR surrounding the hub; and, the key 1K and other means for securing the rotor 3 to shaft 1.

With reference to miscellaneous details: the pinion gears PG1, PG2 and PG3 (Figs. 1 and 7) may each be provided with a set of needle journals PG' inclosed by pressed-in washers PG''; the drive-gears SG1 and SG2 may each be provided with enlightening holes SG' each inclosed by pressed-in discs SG'' (Fig. 1); the pair of ignition coils 9C may be mounted in a water-tight box located adjacent the left end of 6H at A as in Fig. 7; and, the bevel ring-gear 6RG and axle shafts 6S therein may be supported upon a pair of projections integral with 6C'.

As the entire motive power assembly, including the prospective transmission couplers, one of latter in each rear traction wheel assembly, are all supported in a non-sprung manner upon such wheels, there would be considerable vibration regardless of any air-torsion dampening applied, so predetermined members of the assembly should be supported from the vehicle frame F, and each connected with a separate flexible means to the assembly part oscillating with the axle shaft housing.

The following two examples exemplify method of computing the displacement capacities of the gearing of the compressor: Assuming all gears to be of 8 diametral pitch, working depth of each tooth to be .250'', root clearance of teeth to be substantially nil, width of each tooth on pitch line to be $\frac{3}{16}''$, the drive-gear SG1 to be 4.5'' long and to have 6'' pitch diameter and 48 teeth, and, wherein there are 8 pinion gears PG1. Then the formula becomes; SG1 teeth × length of $$SG1 \times \tfrac{3}{16}'' \times \tfrac{1}{4}'' \times (2 \times \text{number of pinion gears PG1})$$

substituting we have—$(48 \times 4.5 \times \tfrac{3}{16}'' \times \tfrac{1}{4}'' \times 16) = 162$ cubical inches of displacement during each revolution of SG1; now assuming SG1 is of 9'' pitch diameter and has 72 teeth, and that there are 10 pinion gears PG1, then by formula we have—

$$(72 \times 4.5'' \times \tfrac{3}{16}'' \times \tfrac{1}{4}'' \times 20) = 303.7$$

cubical inches of displacement during each revolution of SG1.

With the use of the entire motive power assembly as described and illustrated herein, no radiator or cooling water system would be required, no differential is required, the compressor output is regulated by the pressure regulator 5PR to maintain about 150 pounds gauge pressure in the accumulator compartment 5AC, and, the turbine is controlled manually through operation of the bell-crank 8BC of distributor 8.

The elastic fluid compressor as illustrated and described herein is in conjunction with an internal combustion turbine, as is considered to be in its best method of adaption use.

Thus having fully described my invention as applied to an internal combustion turbine motive power assembly, I claim:

1. A multiple drive and pinion geared self contained multiple pressure staged compounded elongated elastic fluid compressor comprising: an annular shaped cored cavity fluid inlet manifold provided with a supply access means and forming one end of said compressor; an annular shaped cored cavity compressed elastic fluid accumulator manifold forming the opposite end of said compressor; a plurality of internally splined different lengths of uniform size compressor drive gears, with one for each pressure stage; a plurality of similar different lengths of uniform size compressor pinion gears each meshable with and driven by its respective length of drive gear; a plurality of similar different lengths of annular shaped pressure staging compressor body portions located intermediate to such manifolds and each provided with a concentric central bore, to receive its respective length of drive gear, and a plurality of symmetrically spaced cylindrical chambers extending parallel to said bore and each provided to rotatably receive its respective length of driven pinion gear; a plurality of relatively narrow annular shaped baffle partitions with one separating each pressure stage gearing; an elongated one direction rotatable drive-shaft extending throughout and beyond said compressor and provided to be rotatively journalled upon an opposed pair of adjustable bearings with one mounted concentrically within each of said manifolds and provided, intermediately to the latter, with a spline for rotatively driving said drive gears, and provided further with a plurality of non-rotatable snap-type sealing rings with one located adjacent either end of said spline; at least one induction access for each 1st stage pinion gear, each extending axially through said inlet manifold from the cored cavity therein to adjacent the out-meshing sides of the 1st stage drive and pinion gears; at least one communication access for each pressure stage pinion gear, each extending diagonally axially through its respective baffle partition from the in-meshing sides of the adjacent lower pressure stage drive and pinion gears to the out-meshing sides of the adjacent higher pressure stage drive and pinion gears; at least one discharge access for each of the highest pressure stage pinion gears, each extending axially through said accumulator manifold from the in-meshing adjacent sides of the highest pressure stage drive and pinion gears into the cored cavity of said accumulator manifold; at least one spring-loaded non-return check-valve covering the accumulator end of each discharge access; a series of elongated combined journal pins and securing bolts each extending concentrically throughout one each of said cylindrical chambers and forming a journal pin for one set of such pressure staging pinion gears and each provided to seat against the outer end of said accumulator manifold and to be threaded adjacent the outer end of said inlet manifold; a combined means for controlling and straining compressed elastic fluid released through a top access of said accumulator; means for recirculating liquid fluid from a base of said accumulator manifold back into the inlet side of such compressor; means connected intermediately to the base of said accumulator and the inlet side of such compressor for automatically regulating the induction supply to and discharge pressure from such compressor; means forming a part of the lower pressure stage drive gears for enlightening same; a series of radially extending fins integral with each of said body portions as combined with a series of access holes extending axially throughout said compressor adjacent said fins for air cooling the compressor; means for enclosing the compressor within a protective casing; and, means whereby such compressor may be used for supplying compressed elastic fuel mixture to a combustion turbine.

2. The multiple drive and pinion geared self contained multiple pressure staged compounded elongated elastic fluid compressor of claim 1 characterised by, said combined means for controlling and straining compressed elastic fluid released through a top access of said accumulator to consist of: an elongated cylindrical preferably bronze check-valve body portion taper threaded in the intermediate length thereof into said top access and projecting to within the cored cavity of said accumulator; an elongated stepped cylindrical bore extending throughout the greater portion of the length of such valve body portion; an elongated cylindrical non-return spring loaded check-valve proper slidable within the larger diameter and seating towards said accumulator at the step of said bore; a threaded plug for adjusting the load spring and for limiting the travel of said check-valve proper; a reduced diameter, slotted, shouldered and threaded cylindrical end of said body portion at the accumulator end thereof and provided with a multiple of annular shaped relatively thin strainer discs adjustably secured over the slots against said shoulder by a collar and a plurality of adjustment nuts; a tubing outlet connection located adjacent the step seat and open to the larger diameter bore; and, an elongated cylindrical electrically energized solenoid coil surrounding the bronze body portion adjacent the larger diameter end of said check-valve proper, and provided to control the opening and closure of the latter.

3. The multiple drive and pinion geared self contained multiple pressure staged compounded elongated elastic fluid compressor of claim 1 characterised by, said means forming a part of the lower pressure stage drive gears for enlightening same to consist of; each lower stage pressure drive gear is provided with a series of symmetrically spaced axially extending cylindrical enlightening holes each machined from one side of such gear the greater portion of the width thereof thereinto and each hole closed at its open end with a pressed-in disc.

4. The multiple drive and pinion geared self contained multiple pressure staged compounded elongated elastic fluid compressor of claim 1 characterised by, said series of radially extending fins integral with each of said body portions as combined with a series of access holes extending axially throughout said compressor adjacent said fins for air cooling the compressor, to consist of: wherein said means for enclosing said compressor is perforated with holes throughout its upper half and encloses a fan rotative with said one direction rotatable driveshaft adjacent to the outer end of said accumulator manifold; wherein during the rotation of such fan it induces air in through said protective casing adjacent such accumulator and forces it through such access holes and around such fins; and, thence out through the upper perforated holes in such protective casing to the atmosphere.

5. In an elongated elastic fluid compressor equipped with, a cored cavity fluid inlet manifold at one end, a cored cavity compressed fluid accumulator manifold at the opposite end thereof and a one direction rotative drive-shaft journalled on opposed adjustable bearings with one of the latter located in each of said manifolds and wherein said shaft extends throughout said compressor to beyond said manifolds, the combination therewith of means for pressure staging said compressor consisting of: a plurality of different lengths of annular shaped pressure staging compressor body portions located intermediate to the manifolds and each provided with a concentric central bore and a plurality of elongated cylindrical chambers symmetrically spaced concentrically about said central bore; a plurality of relatively narrow annular shaped baffle partitions with one separating each pressure stage of the compressor; a set of uniform diameter compressor drive gears, with one drive gear of and for each length of the body portions of each rotatively driven by and supported upon said shaft closely within said central bore; a series of sets of uniform diameter driven pinion gears with one of latter of and for each cylindrical chamber of each length of body portions, each meshing with its respective pressure staging drive gear of similar length, and, each set rotative closely within its respective cylindrical chamber; a series of elongated combined journal pins and securing bolts extending throughout the compressor and threaded into one of the manifolds with one extending concentrically throughout each cylindrical chamber as a journal for the respective set of pinion gears therein, and, all provided to secure said compressor tightly together as a unit; supply access means with one extending from the inlet manifold to adjacent each 1st stage pinion gear; communication access means with one extending from adjacent each lower pressure stage pinion gear diagonally axially through the adjacent baffle partition to adjacent the next higher pressure stage pinion gear; discharge access means with one extending from adjacent each highest pressure stage pinion gear into said accumulator manifold; a non-return spring-loaded check-valve with one covering the accumulator end of each discharge access means; and, an external means connected to a base of said accumulator for automatically regulating the supply and the discharge pressure of said compressor.

6. An elongated annular shaped elastic fluid compressor provided with means for pressure staging same comprising: an elastic fluid inlet manifold at one end; a compressed elastic fluid accumulator manifold at the opposite end thereof; a one direction rotatable driveshaft journalled on opposed adjustable bearings with one of the latter located in each of the manifolds and wherein said shaft extends throughout said compressor to beyond said manifolds; a plurality of different lengths of annular shaped pressure staging compressor body portions located intermediately to the manifolds and each provided with a concentric central bore and a plurality of elongated cylindrical chambers symmetrically spaced concentrically about said central bore; a plurality of relatively narrow annular shaped baffle partitions with one separating each pressure stage of the compressor; a set of uniform diameter compressor drive gears, with one of and for each length of body portions and each supported upon and rotatively driven by said shaft closely within said central bore; a series of sets of uniform diameter driven pinion gears with one of and for each cylinder chamber of each length of body portions, each meshing with its respective pressure staging drive gear of similar length, and, each set rotative closely within its respective cylindrical chamber; a series of elongated combined journal pins and securing bolts extending throughout the compressor and threaded into one of the manifolds with one extending concentrically throughout each cylindrical chamber as a journal for the respective set of pinion gears therein, and, all provided to secure said compressor tightly together as a unit; a plurality of supply accesses with one extending from the inlet manifold to adjacent each 1st stage pinion gear; a plurality of communication accesses with one extending from adjacent each lower pressure stage pinion gear diagonally axially through the adjacent baffle partition to adjacent the next higher pressure stage pinion gear; a plurality of discharge accesses with one extending from adjacent each highest pressure stage pinion gear into said accumulator manifold; a plurality of non-return spring-loaded check-valves with one covering the accumulator end of each discharge access; and, an external means connected between a base of said accumulator manifold and a supply side of said inlet manifold for automatically regulating the supply and discharge pressure of said compressor.

7. An elongated elastic fluid compressor, that may be used in its best adaption arrangement in conjunction with an internal combustion turbine, and which compressor is provided with means for pressure staging same comprising: an inlet manifold at one end; an accumulator manifold at its opposite end; a rotatable drive-shaft extending therethroughout; a plurality of different lengths of pressure staging compounding cylindrical compressor body portions located intermediately to the manifolds and each provided with a central bore with a plurality of similar lengths of cylindrical chambers symmetrically spaced thereabout; a plurality of baffle partitions with one separating each pressure stage; a set of compressor drive gears with one of and for each length of body portions and each rotatively driven by said shaft closely within said central bore; a series of sets of driven pinion gears with one for each cylindrical chamber of each length of body portions, each meshing with its respective pressure staging drive gear of similar length, and, each set rotative closely within its respective cylindrical chamber; a series of elongated combined journal pins and securing bolts threaded at one end and provided to extend throughout the compressor and to secure it tightly together as a unit, and, each provided to extend concentrically throughout its respective cylindrical chamber as a journal for the respective set of pinion gears therein; a plurality of supply accesses with one extending from the inlet manifold to adjacent each 1st stage pinion gear; a plurality of communication accesses with one extending from adjacent each lower pressure stage pinion gear diagonally axially through the adjacent baffle partition to adjacent the next higher pressure stage pinion gear; a plurality of discharge accesses with one extending from adjacent each highest pressure stage pinion gear into said accumulator manifold; a plurality of non-return spring-loaded check-valves with one covering the accumulator end of each discharge access; and, an external means connected between a base of said accumulator manifold and a supply side of said inlet manifold for automatically regulating the supply and discharge pressures of said compressor.

8. An elongated cylindrical multiple pressure staged compounded elastic fluid compressor provided with: an inlet manifold at one end; an accumulator manifold at its opposite end; a one direction rotatable drive-shaft extending therethroughout; a plurality of different lengths of pressure staging compounding cylindrical compressor body portions located intermediately to the manifolds and each provided with a central bore with a plurality of similar lengths of cylindrical chambers symmetrically spaced thereabout; a plurality of baffle partitions with one separating each pressure stage; a set of uniform diameter compressor drive gears with one of and for each length of body portions and each rotatively driven by said shaft closely within said central bore; a series of sets of driven pinion gears with one for each cylindrical chamber of each length of body portions, each meshing with its respective pressure staging drive gear of similar length, and, each set of uniform diameter and rotative closely within its respective cylindrical chamber; a series of elongated combined journal pins and securing bolts each threaded at one end and shouldered at the opposite end and provided to extend concentrically throughout its respective cylindrical chamber, as a journal for the respective set of pinion gears therein, and wherein all of such bolts secure the compressor tightly together as a unit; a plurality of supply accesses with one extending from the inlet manifold to adjacent each 1st stage pinion gear; a plurality of communication accesses with one extending from adjacent each lower pressure stage pinion gear diagonally axially through the adjacent baffle partition to adjacent the next higher pressure stage pinion gear; a plurality of discharge ports with one extending from adjacent each highest pressure stage pinion gear into said accumulator manifold; a plurality of check-valves with one covering the accumulator end of each discharge port; an external means connected between a base of said accumulator manifold and a supply side of said inlet manifold for automatically regulating the supply and discharge pressure of said compressor; and, a combined strainer and check-valve means controlling a top outlet access in said accumulator manifold.

9. An elongated cylindrical multiple pressure stage compounded elastic fluid compressor provided with: an inlet manifold at one end; an accumulator manifold at its opposite end; a one direction rotatable drive-shaft extending therethroughout; a set of different lengths of cylindrical compressor body portions located intermediately to the manifolds and each provided with a central bore with a plurality of similar lengths of cylindrical chambers symmetrically spaced thereabout; a plurality of baffle partitions with one separating each pressure stage; a set of uniform diameter pressure staging compressor drive gears with one of and for each length of body portions and each slidably over and rotatively driven by said shaft closely within said central bore; a series of sets of uniform diameter driven pinion gears with one of and for each cylindrical chamber length and rotative closely therein by meshing with its respective length of drive gear; a series of journal pins one for each set of pinion gears and all provided with means for securing the compressor tightly together as a unit; a plurality of supply accesses with one extending axially from the inlet manifold to the adjacent out-meshing side of each 1st stage pinion gear; a plurality of communication accesses with one extending from the adjacent in-meshing side of each lower pressure stage pinion gear diagonally axially through the adjacent baffle partition to the adjacent outmeshing side of the next higher pressure stage pinion gear; a plurality of discharge ports with one extending axially from the adjacent in-meshing side of each highest pressure stage pinion gear into said accumulator manifold; a plurality of spring-loaded removable check-valves with one covering the accumulator end of each discharge port; a combined strainer and check-valve means controlling a top outlet access in said accumulator manifold; an external means connected between a base of said accumulator manifold and a supply side of said inlet manifold for automatically regulating the supply and discharge pressures of said compressor; means for recirculating a fluid from said base of said accumulator back into said inlet manifold; means for enlightening the lower pressure stage drive gears; means for enclosing said compressor in a protective jacket as combined with means for air cooling such compressor as a unit; means for mounting such compressor unit on one side of an axle shaft housing of an automotive vehicle; means for journalling said drive-shaft within said manifolds; and, means whereby such compressor unit may be used for supplying compressed elastic fluid under a predetermined regulated pressure to and for an internal combustion turbine used in conjunction with such unit compressor.

10. An elongated cylindrical multiple pressure stage compounded elastic fluid compressor provided with: an inlet manifold at one end; an accumulator manifold at its opposite end; a one direction rotatable drive-shaft extending throughout the manifolds; a plurality of different lengths of cylindrical compressor body portions located intermediately to the manifolds and each provided with a central bore with a plurality of similar lengths of cylindrical chambers symmetrically spaced thereabout; a plurality of baffle partitions with one separating each pressure stage; a set of uniform diameter pressure staging compressor drive gears with one of and for each length of body portions and each rotatively driven by said shaft closely within said central bore; and, a series of sets of uniform diameter driven pinion gears with one of and for each cylindrical chamber length and rotative closely therein by meshing with its respective length of drive gear.

11. An elongated fabricated cylindrical multiple pressure stage compounded elastic fluid compressor provided with: an inlet manifold at one end; an accumulator manifold at its opposite end; a rotatable drive-shaft extending therethroughout; a set of different lengths of compressor body portions located intermediately to the manifolds and each provided with a central bore with a plurality of cylindrical chambers symmetrically spaced thereabout; a plurality of baffle partitions with one separating each pressure stage; a set of uniform diameter pressure staging drive-gears with one rotative within each length of said bore; a series of sets of uniform diameter driven pinion gears with one rotative within each length of such cylindrical chambers; means for securing such compressor tightly together as a unit; and, means for enclosing suitable access porting for such compressor completely within the latter.

References Cited in the file of this patent

UNITED STATES PATENTS

| Number | Name | Date |
|---|---|---|
| 1,443,764 | Smith | Jan. 30, 1923 |
| 1,626,768 | Vollmann | May 3, 1927 |
| 1,972,374 | Brannigan | Sept. 4, 1934 |
| 2,009,137 | Kleckner | July 23, 1935 |
| 2,145,863 | Curioni et al. | Feb. 7, 1939 |
| 2,531,014 | Thomas | Nov. 21, 1950 |
| 2,628,014 | Pemmerl | Feb. 10, 1953 |
| 2,645,903 | Elkins | July 21, 1953 |
| 2,663,147 | Dameron | Dec. 22, 1953 |
| 2,667,744 | Butler | Feb. 2, 1954 |
| 2,680,949 | Butler | June 15, 1954 |
| 2,746,248 | Butler | May 22, 1956 |
| 2,776,086 | Selden | Jan. 1, 1957 |

FOREIGN PATENTS

| Number | Country | Date |
|---|---|---|
| 660,528 | France | Feb. 19, 1929 |